(12) United States Patent
Enyedy (10) Patent No.: US 10,259,066 B2
(45) Date of Patent: Apr. 16, 2019

(54) METHOD AND SYSTEM FOR WELDER THEFT PROTECTION

(71) Applicant: LINCOLN GLOBAL, INC., City of Industry, CA (US)

(72) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 498 days.

(21) Appl. No.: 14/828,070

(22) Filed: Aug. 17, 2015

(65) Prior Publication Data

US 2017/0050256 A1 Feb. 23, 2017

(51) Int. Cl.
*B23K 9/10* (2006.01)
*B23K 9/32* (2006.01)

(52) U.S. Cl.
CPC .............. *B23K 9/10* (2013.01); *B23K 9/1006* (2013.01); *B23K 9/1087* (2013.01); *B23K 9/32* (2013.01)

(58) Field of Classification Search
CPC .......... B23K 9/1087; B23K 9/10; B23K 9/32; B23K 9/1006; B23K 9/095; B23K 9/1062; B23K 9/1043; B23K 9/0953; B23K 9/1081; B23K 9/0956; B23K 9/1336; B23K 9/1056; B23K 9/125; B23K 9/173; B23K 9/295; B23K 9/013; B23K 9/06; B23K 9/067; B23K 9/09; B23K 9/092; B23K 9/1012; B23K 9/1031; B23K 9/1075; B23K 9/124; B23K 9/133; B23K 9/16; B23K 9/167; B23K 9/28; B23K 9/291; B23K 9/323; B23K 9/327

USPC .. 219/133, 134, 130.21, 130.1, 132, 130.01, 219/137.71, 108, 121.54, 130.5, 136, 219/137 R, 109, 110, 121.39, 121.44, 219/121.46, 121.55, 124.1, 125.1, 130.33, 219/137 PS, 137.2, 137.43, 439, 523, 538,
(Continued)

(56) References Cited

U.S. PATENT DOCUMENTS 5,561,330 A * 10/1996 Crook ................. F02N 11/0803
290/30 R
6,998,957 B2 2/2006 Shibata et al.
(Continued)

FOREIGN PATENT DOCUMENTS

CA 2637998 1/2010
CN 201285579 8/2009
(Continued)

OTHER PUBLICATIONS

G.C. Skipper, Contributing Editor; Construction Equipment; How to Choose Equipment—Theft Deterrents; Aug. 1, 2009; 5 pgs.

Primary Examiner — Ibrahime A Abraham
Assistant Examiner — Chris Q Liu
(74) Attorney, Agent, or Firm — Tucker Ellis LLP (57) ABSTRACT

A system and method are disclosed for securing a welding device where functionality of the welding device can be limited or restricted due to an electronic signal between a lock component and an activation device. The activation device can be paired with the welding device, and in turn, the lock component, in which an electronic signal is communicated there between. Based upon whether the electronic signal is received by the lock component and the welding device, the lock device can be configured to de-activate or prevent a power supply (e.g., motor, generator, energy storage device, etc.) of the welding device from activating.

18 Claims, 9 Drawing Sheets

(58) Field of Classification Search
USPC ..... 219/78.01; 307/326–328; 340/5.31, 10.4, 340/105, 12.27
See application file for complete search history.

(56) References Cited

U.S. PATENT DOCUMENTS

| | | |
|---|---|---|
| 8,686,318 B2 | 4/2014 | Albrecht et al. |
| 8,930,054 B2 | 1/2015 | Garcia |
| 2006/0169682 A1* | 8/2006 | Kainec ................. B23K 9/1087 219/125.1 |
| 2008/0035727 A1 | 2/2008 | Stanzel et al. |
| 2008/0264922 A1* | 10/2008 | Fosbinder ............ B23K 9/1006 219/133 |
| 2009/0009283 A1 | 1/2009 | Arts |
| 2012/0323407 A1 | 12/2012 | Koike |
| 2014/0051359 A1 | 2/2014 | Dina et al. |

FOREIGN PATENT DOCUMENTS

| | | |
|---|---|---|
| FR | 2711871 | 5/1995 |
| FR | 2884787 | 10/2006 |
| JP | 2007090949 | 4/2007 |
| JP | 2014061845 | 4/2014 |
| KR | 20060055038 | 5/2006 |

\* cited by examiner

METHOD AND SYSTEM FOR WELDER THEFT PROTECTION

TECHNICAL FIELD

The invention described herein pertains generally to a system and method that affords a security and anti-theft system to a welding device.

BACKGROUND OF THE INVENTION

Frequently, welding is required where supply power may not be readily available. As such, the welding power supply may be an engine driven welding power supply incorporating a generator. The generator may supply power to the welder as well as to other power tools as may be needed on site. As different applications require different versions of welders and power tools, the trailer may be designed to carry one of many different types of welding power supplies.

Welders having engines and/or generators are often valuable. Unfortunately, a problem with welding, cutting and generator equipment is theft because of this value. The machines can be portable and typically left on a job site, for example on a trailer attached to a truck. As such these job sites become a target for theft. Thieves can steal the welders and remove the engine and/or generator to sell for parts as these components can be used without the welding components, controls, etc. Although some theft can be deterred by securing the welders, thieves often still find a way to overcome security measures. For example, a band of thieves went to the extent of cutting a hole into a wall at a store that sold welders because of the high value of the engines and generators.

SUMMARY OF THE INVENTION

In accordance with the present invention, there is provided a welding device that includes an activation device that is electronically paired to the welding device. The electronic pairing to the welding device includes: a discovery signal transmitted from the welding device to the activation device and the activation device transmitting an identifying signal that identifies the activation device in response to the discovery signal, wherein an authorization code is verified between the activation device and the welding device; and a link key that is generated by the welding device and stored in response to the authorization code verification. The welding device further includes a motor-driven welder assembly including a motor that is a power source for the welding device or an equipment electrically coupled to the welding device. The welding device includes a lock component that is configured to prevent the motor or the equipment from activating unless the link key is received from the activation device and the lock component is further configured to de-activate the motor or the equipment upon interruption of receipt of the link key from the activation device.

In accordance with the present invention, there is provided a welding device that performs a welding operation that includes a power supply that is configured to deliver power used to create a puddle between an electrode and a workpiece for the welding operation and a user interface that is configured to at least one of communicate data or receive an input. The welding device can include a controller that is configured to communicate machine readable instructions to control at least one of the power supply or the user interface, wherein the controller is further configured to communicate a first electronic signal. The welding device can further include an activation device that is configured to communicate a second electric signal to the welding device with a physical connection to the welding device or a wireless connection to the welding device. The welding device can include a lock component that is configured to detect the first electronic signal from the controller and the second electronic signal from the activation device, wherein the lock component is further configured to de-activate the power supply if the first electronic signal or the second electronic signal are not detected.

In accordance with the subject invention, there is provided an engine-driven welding device that includes a motor that is a power source for the welding device to perform a welding operation or an equipment electrically coupled to the welding device and a controller that is configured to communicate machine readable instructions to control the welding operation. The welding device can include an energy storage device that is an additional power source for the welding device to perform the welding operation and at least one of the motor, the energy storage device, or the controller are further configured to communicate a first electronic signal. The welding device further includes a switch component that selects between the energy storage device and the motor based on a welding parameter that affects the welding operation and an activation device that is configured to communicate a second electric signal to the welding device with a physical connection to the welding device or a wireless connection to the welding device. The welding device further includes a lock component that is configured to detect the first electronic signal and the second electronic signal from the activation device, wherein the lock component is further configured to de-activate at least one of the motor, the energy storage device, or the controller if the first electronic signal or the second electronic signal are not detected.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to security features for a welding device in which functionality of the welding device can be limited or restricted due to an electronic signal between a lock component and an activation device. The activation device can be "paired" with the welding device, and in turn, the lock component, in which an electronic signal is communicated there between. Based upon whether the electronic signal is received by the lock component and the welding device, the lock device can be configured to de-activate or prevent a power supply (e.g., motor, generator, energy storage device, etc.) of the welding device from activating. The welding device further includes a settings component that is configured to provide additional features for restricting activation of a power supply for the welding device such as, but not limited to, geographic location, duration of time, user input via a user interface for the welding device, among others. In another embodiment, the welding device further includes a diagnostic component that is configured to allow the transmission of diagnostic data to a device from the welding device even though the electronic signal between the lock component and the activation device is not received.

In an embodiment, the subject innovation can include a generator (e.g., a device that creates welding power, plasma cutting power, 50 Hz power, 60 Hz power, and the like), welder, or a cutting machine that utilizes an engine, a generator, a controller and an activation device. The controller can include functionality and/or components for controlling the welding or cutting output. The controller can also activate and/or de-activate the engine, wherein the control of the engine can include fuel injection, fuel pump 516 operation, starting, charging, among others. The subject innovation further includes a lock component that will either terminate a running/activated engine of the welding device or prevent the engine of the welding device from being activated without the activation device. In another embodiment, the engine of the welding device will not activate or will be de-activated if the controller is not detected within the welding device. Such embodiment is a security measure that restricts functionality of the welding device in the event that the welding device is stolen and strips out the engine from the welding device. Thus, if the engine is stripped from the welding device, the engine will not function since the controller is not detected and/or the activation key is not detected.

In another embodiment, a user interface can be utilized with the welding device. The lock component can detect a user input via the user interface in order to allow activation or use of the engine of the welding device. For example, the user interface can be used to start the engine of the welding device and upon request via the user interface to activate the engine, the user interface can display a request for a passcode or data entry from the user (e.g., voice command, biometric input, username, etc.). In still another embodiment, the lock component can allow the engine to activate but a welding operation cannot be performed until a data entry is received. In still another embodiment, the lock component can include a duration of time for each data entry such that the functionality of the welding device and/or the engine is limited to such duration of time based on the data entry received.

The subject innovation can further include identify and use an additional activation device to unlock the welding device. The lock component can identify additional devices via a wireless scan in order to pair with such additional devices for use as an additional activation device. For example, the additional device can be, but not limited to being, a smartphone, a cell phone, a device with wireless communication functionality, an automotive key fob, a device with a USB connection, a helmet, a wearable item that has a wireless communication component, among others. It is to be appreciated that the activation device can be utilized with one or more welding machines.

In another embodiment, the lock component can include a pre-defined duration of time that if the activation device is present, the welding device and/or engine will still operate. This allows for when a worker is often a distance away for a brief period of time, the welding device will still operate.

The subject innovation for the welding device can further include a remote activation and/or de-activation. In still another example, the activation device can be reset from a remote signal. In the event the welding device is stolen, the activation device for the welding device can be set to prevent an operation until the welding device is returned to the rightful owner.

"Welding" or "weld" as used herein including any other formatives of these words will refer to depositing of molten material through the operation of an electric arc including but not limited to gas shielded flux cored arc welding (G-FCAW), submerged arc, GTAW, GMAW, MAG, MIG, TIG welding, or any electric arc used with a welding system. Moreover, the welding operation can be on a workpiece that includes a coating such as, but not limited to, a galvanized coating.

The term "paired" as used herein can be defined as a wired, wireless, and/or physical connection that is secure between a first device (welding device, welder, cutting device, etc.) and a second device (e.g., activation device) to communicate data between the first device and the second device. For example, the first device can communicate a discovery signal which can be received by the second device. In response to the discovery signal, the second device can communicate an identifying signal to the first device, wherein the identifying signal includes information about the second device that is received by the first device. In response to receiving the identifying signal, the first device can select or a user input can select the second device to establish communication of an authorization code. In an embodiment, the authorization code can be displayed on the second device or included in documentation for the second device and a user input of the authorization code for verification can be input to the first device. In another embodiment, the authorization code can be displayed on the first device and entered for verification on the second device. In still another embodiment, the authorization code can be provided in documentation for the first device and entered for verification to the second device. Upon verification of the authorization code between the first device and the second device, a portion of data (e.g., a link key, a key, etc.) can be generated and stored for referenced for connectivity between the first device and the second device.

The term "component" as used herein can be defined as a portion of hardware, a portion of software, or a combination thereof. A portion of hardware can include at least a processor and a portion of memory, wherein the memory includes an instruction to execute.

The subject innovation can be used with any suitable engine-driven welder, engine-driven welding system, engine-driven welding apparatus, a welding system powered by an engine, a welding system powered by a battery, a welding system powered by an energy storage device, a hybrid welder (e.g., a welding device that includes an engine driven power source and an energy storage device or battery), or a combination thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as, arc welding, plasma cutting, and gouging operations. It is to be appreciated that a power source can generate a portion of power, wherein the portion of power is electrical power. It is to be appreciated that "power source" as used herein can be a motor, an engine, a generator, an energy storage device, a battery, a component that creates electrical power, a component that converts electrical power, or a combination thereof. It is to be appreciated that a switch component can be configured to automatically switch between the engine (or generator) and the energy storage device to supply power to perform the welding operation. By way of example and not limitation, FIGS. 1-4 illustrate welding systems or devices that can be utilized with the subject innovation. It is to be appreciated that the following welding systems are described for exemplary purposes only and are not limiting on the welding systems that can utilize the subject innovation or variations thereof.

Figure 1:
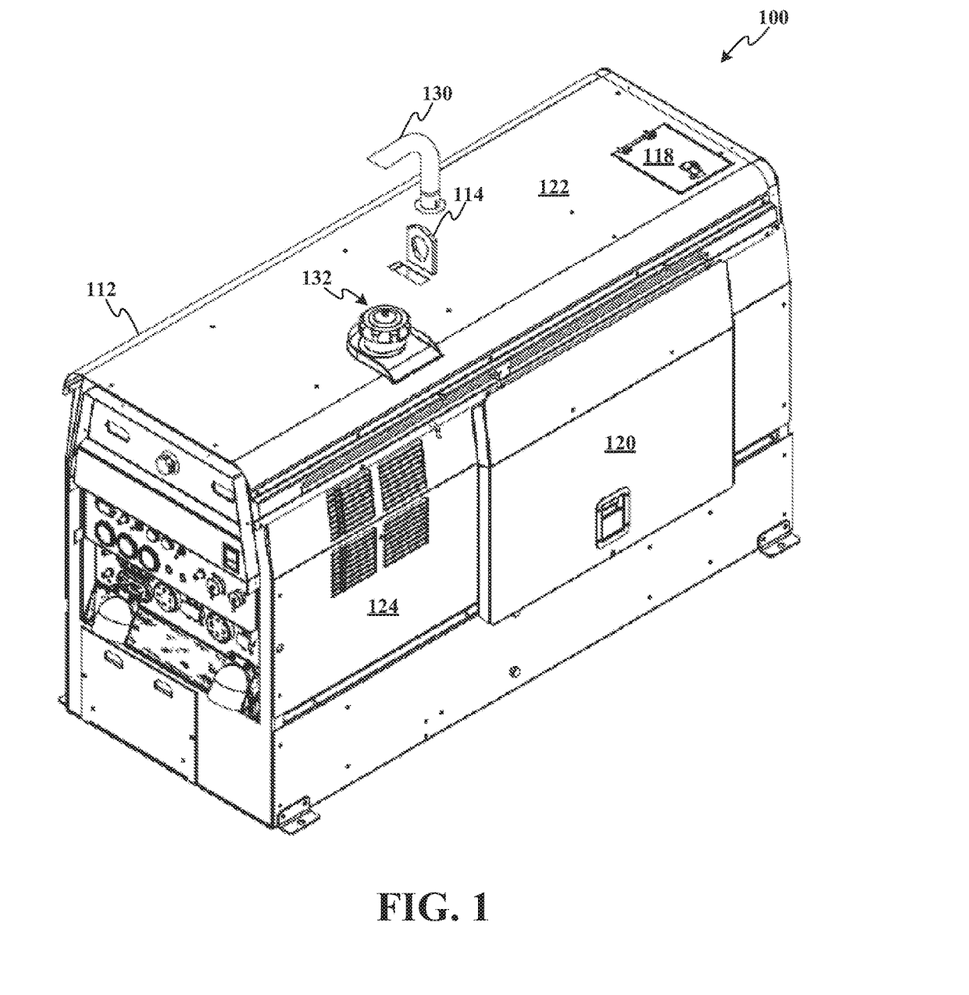
FIG. 1 is a block diagram illustrating a welding device that includes a motor as a power source.

FIG. 1 illustrates a welding device 100. The welding device 100 includes a housing 112 which encloses the internal components of the welding device. Optionally, the welding type device 100 includes a loading eyehook 114 and/or fork recesses. The loading eyehook 114 and the fork recesses facilitate the portability of the welding device 100. Optionally, the welding-type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding device 100 including, for example, an energy storage device suitable for providing welding-type power. An end panel includes a louvered opening to allow for air flow through the housing 112.

The housing 112 of the welding-type device 100 also houses an internal combustion engine or a motor. The engine is evidenced by an exhaust port 130 and a fuel port 132 that protrude through the housing 112. The exhaust port 130 extends above the top panel 122 of the housing 112 and directs exhaust emissions away from the welding-type device 100. The fuel port 132 preferably does not extend beyond the top panel 122 or side panel 124. Such a construction protects the fuel port 132 from damage during transportation and operation of the welding-type device 100.

Figure 2:
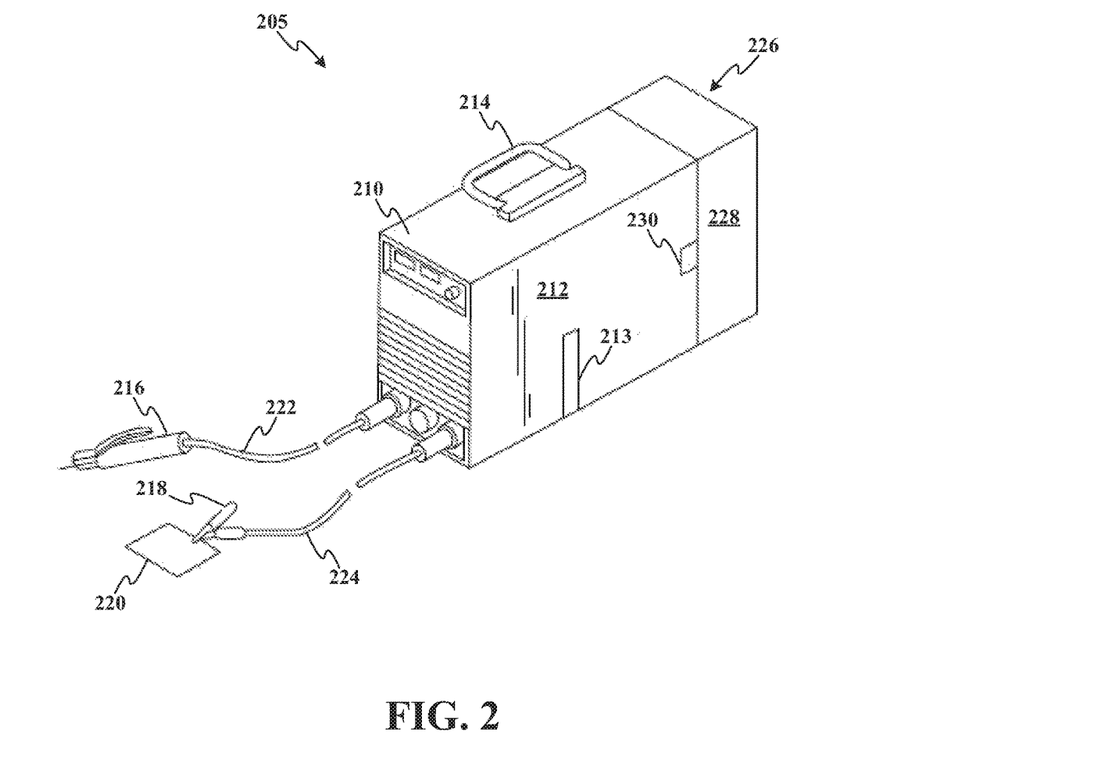
FIG. 2 is a block diagram illustrating a welding device.

Referring now to FIG. 2, a perspective view of a welding apparatus 205 that can be utilized with the subject innovation. Welding apparatus 205 includes a power source 210 that includes a housing 212 enclosing the internal components of power source 210. As will be described in greater detail below, housing 212 encloses control components 213. Optionally, welding device 210 includes a handle 214 for transporting the welding system from one location to another. To effectuate the welding process, welding device 210 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding-type device, is produced. Connecting torch 216 and grounding clamp 218 to housing 212 is a pair of cables 222 and 224, respectively.

The welding arc or cutting arc is generated by the power source by conditioning raw power received from an interchangeable energy storage device 226. In a preferred embodiment, energy storage device 226 is a battery. Energy storage device 226 is interchangeable with similarly configured batteries. Specifically, energy storage device 226 is encased in a housing 228. Housing 228 is securable to the housing of welding device 210 thereby forming welding-type apparatus 205. Specifically, energy storage device 226 is secured to power source 210 by way of a fastening means 230. It is contemplated that fastening means 230 may include a clip, locking tab, or other means to allow energy storage device 226 to be repeatedly secured and released from power source 210.

Figure 3:
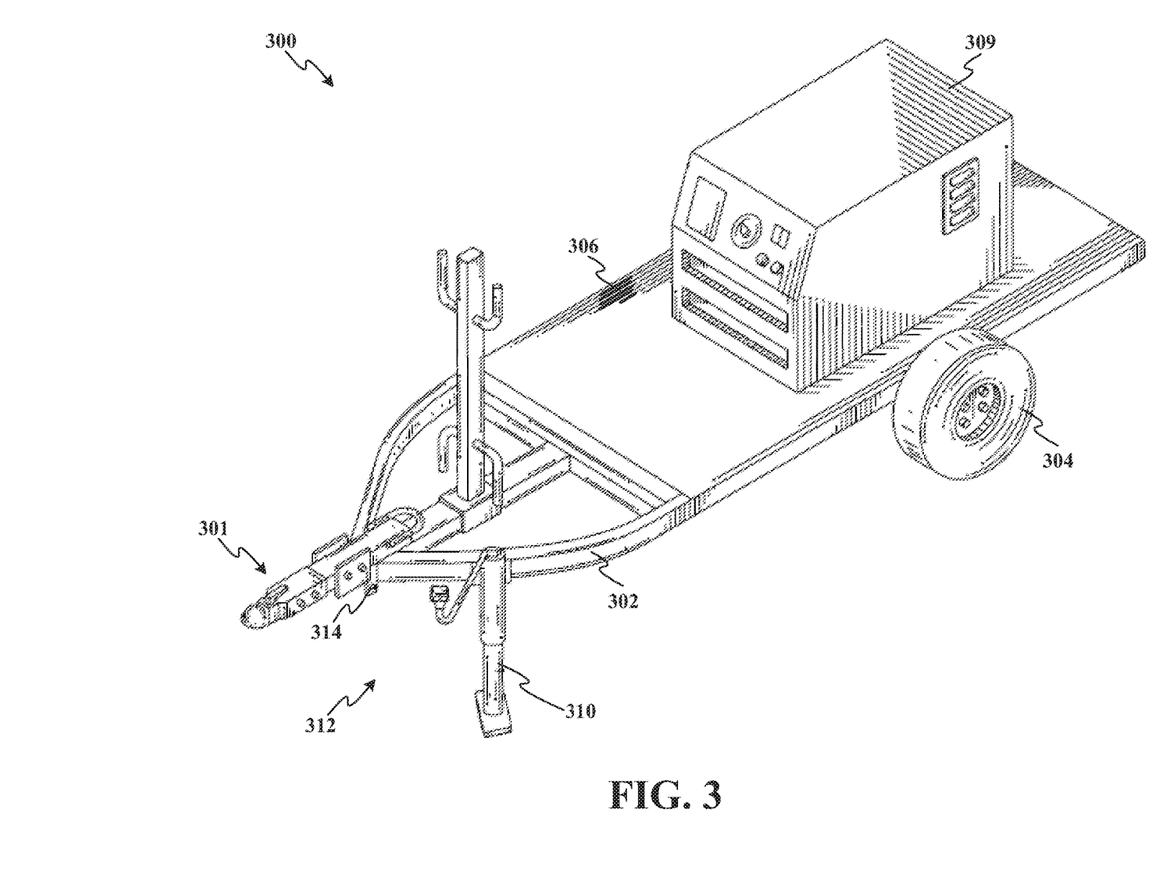
FIG. 3 is a block diagram illustrating a welding device affixed to a trailer for mobility.

FIG. 3 illustrates a trailer 300 incorporating a trailer hitch or hitching device, depicted generally at 301. The trailer 300 may include a trailer frame 302 and one or more trailer wheels 304 in rotational connection with the trailer frame 302 and may further include a payload region 306 for carrying one or more cargo items, which in an exemplary manner may be a welding power supply 309 or an engine driven welding power supply 309. The trailer 300 may also include an adjustable stand 310 for adjusting the height of the front end 312 of the trailer 300. However, any means may be used for raising and/or lowering the front end 312 of the trailer 300. The trailer hitch 301 may be a generally longitudinal and substantially rigid trailer hitch 301 and may be attached to the frame 302 via fasteners 314, which may be threaded bolts.

Figure 4A:
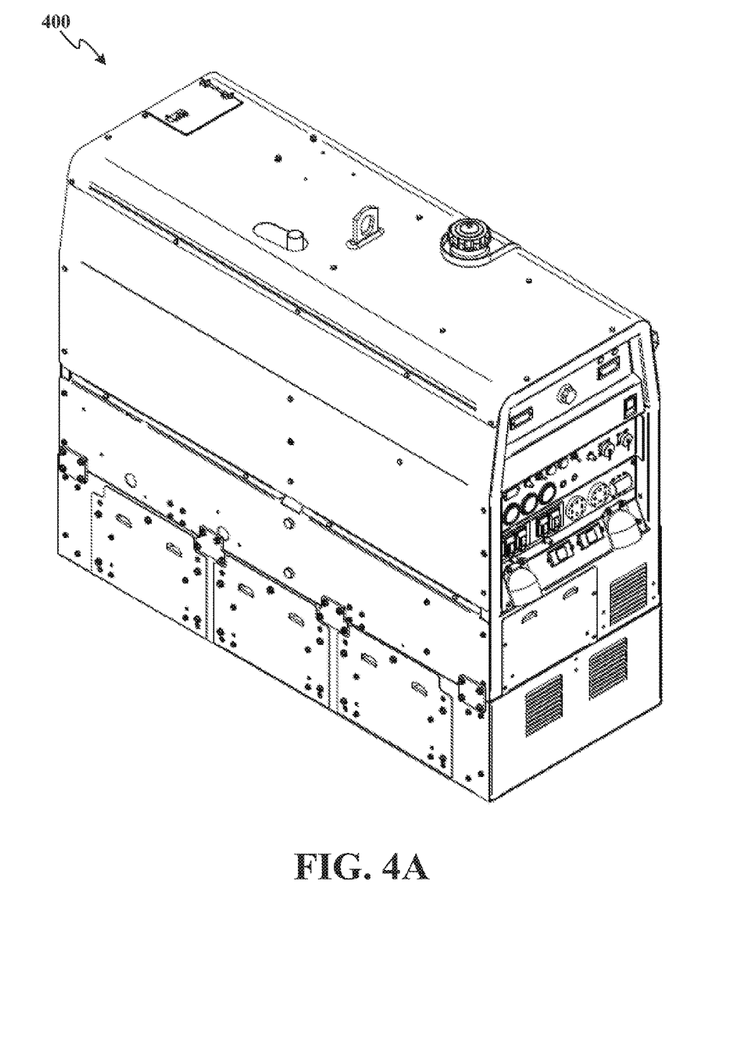
FIG. 4A is a block diagram illustrating a welding device.
Figure 4B:
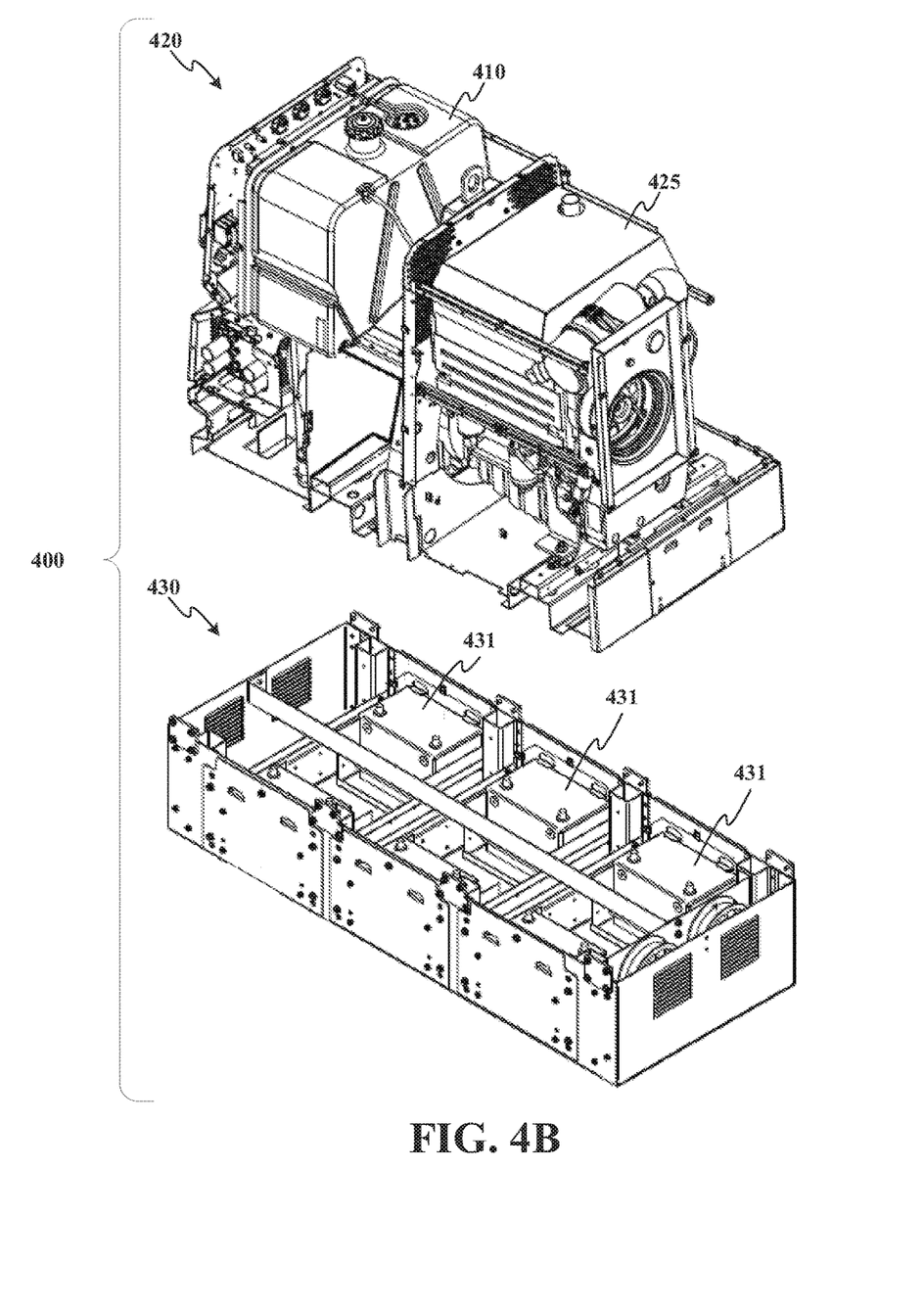
FIG. 4B is a block diagram illustrating a welding device.

FIGS. 4A and 4B illustrate a hybrid welding device (herein referred to as a "hybrid welder"). A hybrid welder according to the invention is generally indicated by the number 400 in the drawings. Hybrid welder 400 includes an engine component that runs on fuel from fuel storage 410 allowing the hybrid welder 400 to be portable. It will be appreciated that hybrid welder 400 may also be mounted in a permanent location depending on the application. Hybrid welder 400 generally includes a motor-driven welder assembly 420 having a motor 425 and an energy storage device 430. Motor 425 may be an internal combustion engine operating on any known fuel including but not limited to gasoline, diesel, ethanol, natural gas, hydrogen, and the like. These examples are not limiting as other motors or fuels may be used.

For instance, the motor 425 or an engine can generate a voltage and such voltage can be stored in energy storage device 430. A switch component can automatically select between motor 425 and energy storage device 430 for a power source for the welding operation performed by the welding device. In an embodiment, the switch component can select between motor 425 and energy storage device 430 based upon a welding parameter.

For instance, the welding parameter can be, but is not limited to, a voltage of the welding operation, a current of the welding operation, a portion of a waveform used with the welding operation, a welding process, a wire type, a wire size, a wire feed speed (WFS), a volts, a current or voltage waveform used to perform the welding operation, a location of a current or voltage waveform being used to perform the waveform, a composition of the workpiece on which the welding operation is performed, sensor data (e.g., video camera, image capture, thermal imaging device, heat sensing camera, temperature sensor, among others), an amount of fuel available for motor, an amount of charge stored in energy storage device, a signal from a controller of the welding operation, a signal from a controller associated with welding device, a user identification, a user that is using the welding device, and the like.

The motor 425 and energy storage device 430 may be operated individually or in tandem to provide electricity for the welding operation and any auxiliary operations performed by hybrid welder 400. For example, individual operation may include operating the motor 425 and supplementing the power from the motor 425 with power from the energy storage device 430 on an as needed basis. Or supplying power from the energy storage device 430 alone when the motor 425 is offline. Tandem operation may also include combining power from motor 425 and energy storage device 430 to obtain a desired power output. According to one aspect of the invention, a welder 400 may be provided with a motor having less power output than ordinarily needed, and energy storage device 430 used to supplement the power output to raise it to the desired power output level. In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Energy storage device 430 may be any alternative power source including a secondary generator, kinetic energy recovery system, or, as shown, one or more batteries 431. In an embodiment, six 12 volt batteries 431 are wired in series to provide power in connection with motor-driven welder assembly 420. Batteries 431 shown are lead acid batteries. Other types of batteries may be used including but not limited to NiCd, molten salt, NiZn, NiMH, Li-ion, gel, dry cell, absorbed glass mat, and the like.

Figure 5:
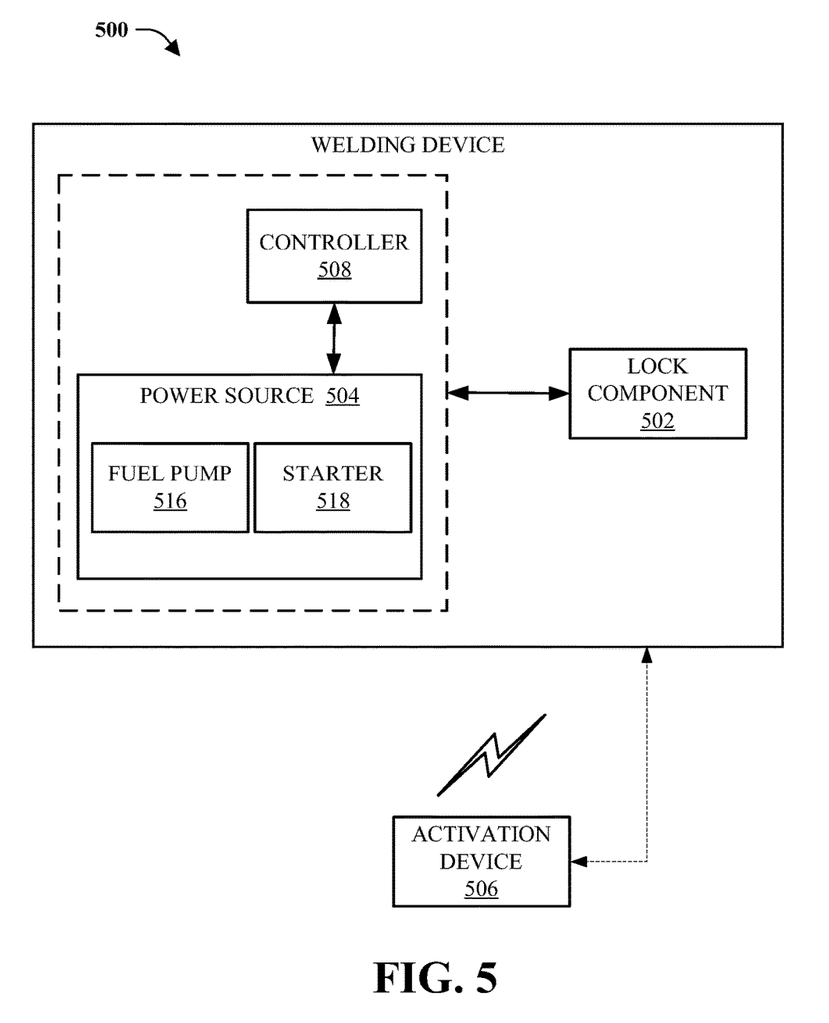
FIG. 5 is a block diagram illustrating welding device that includes a lock component to employ a security feature.
Figure 6:
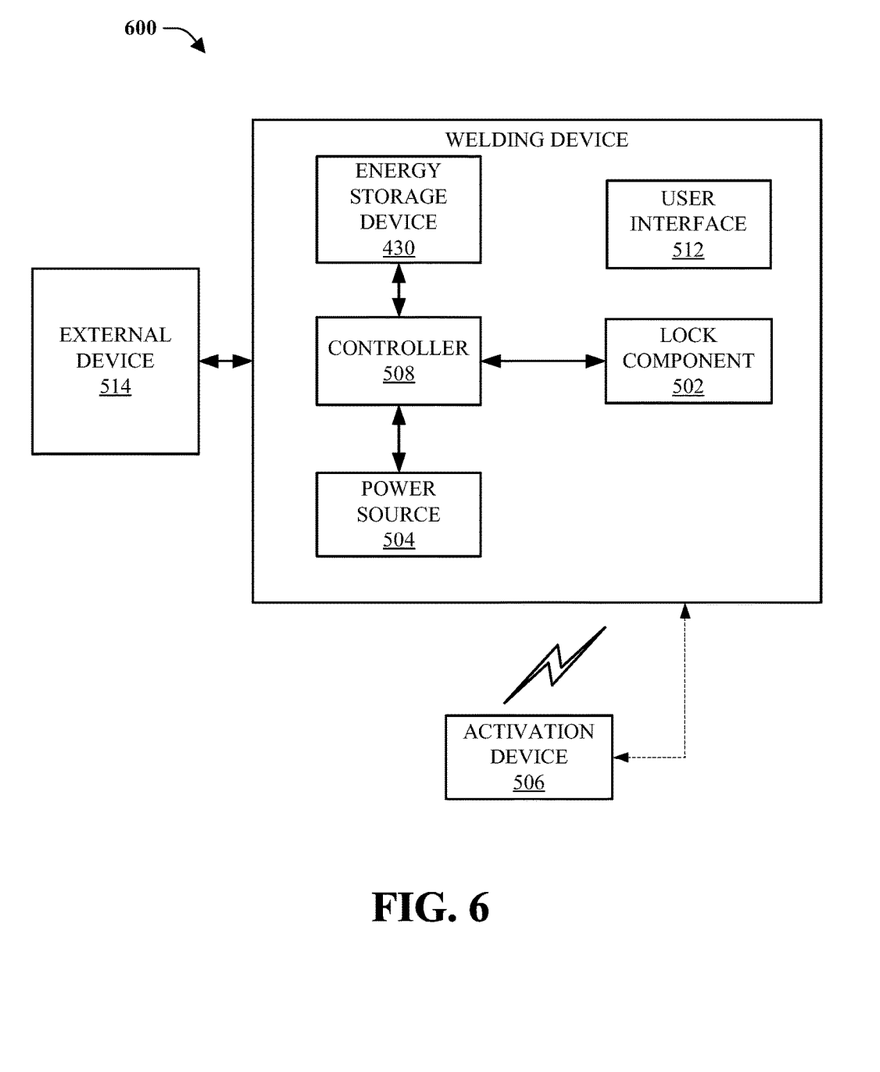
FIG. 6 is a diagram illustrating a welding device having a user interface in accordance with the subject innovation.
Figure 7:
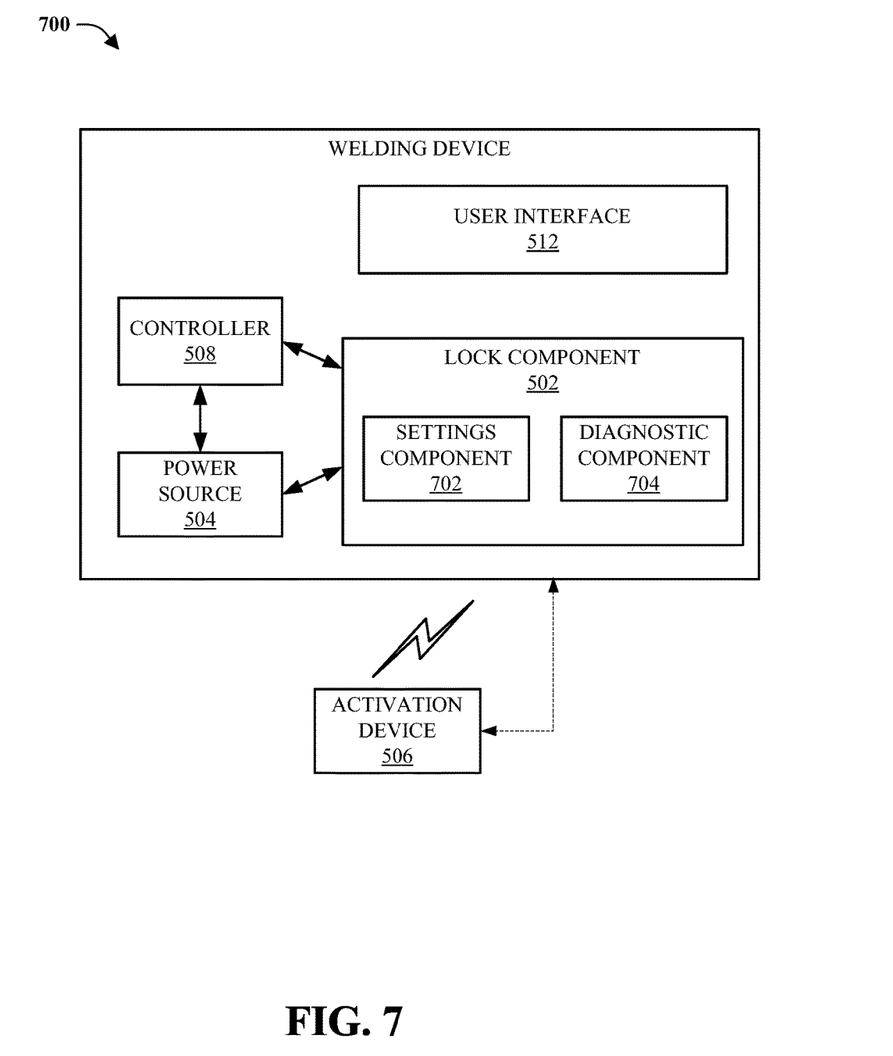
FIG. 7 is a diagram illustrating a welding device that includes a lock component which prevents operation of at least a portion of operations of the welding device.
Figure 8:
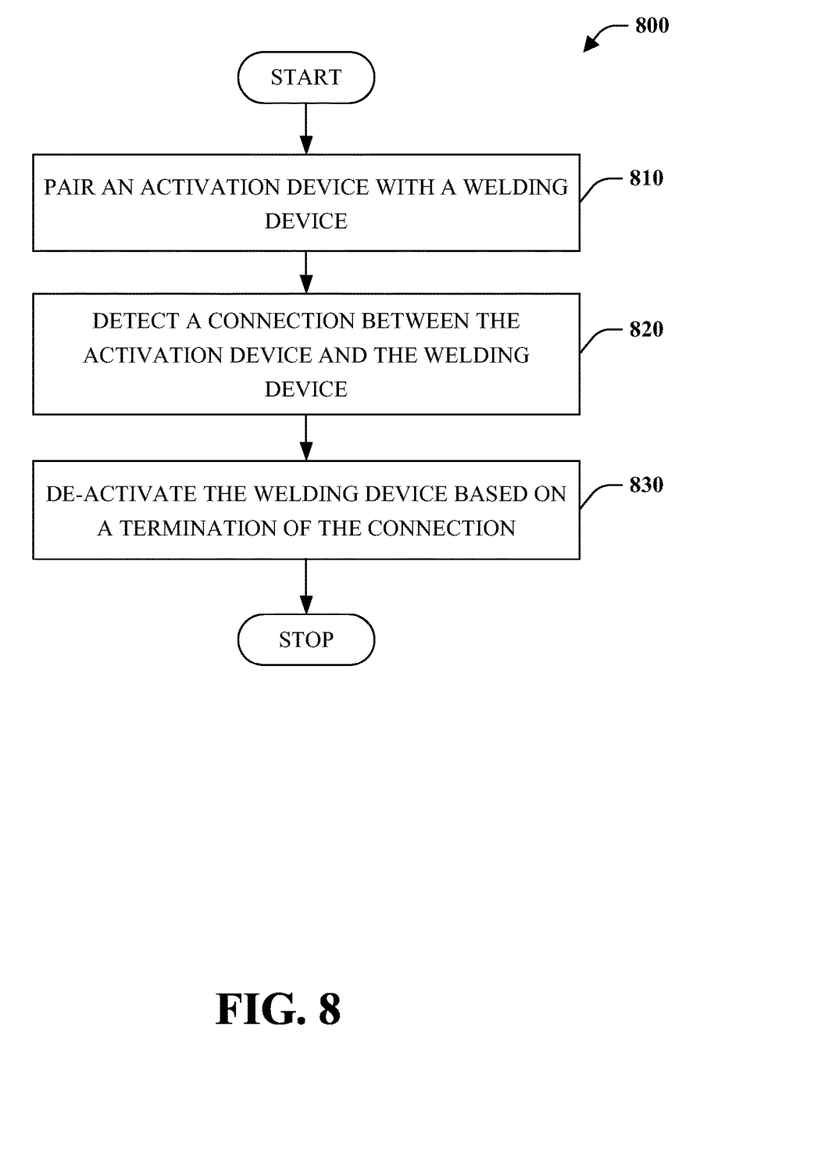
FIG. 8 is a flow diagram of detecting an electronic signal from an activation device and in response to the electric signal determine an operation of the welding device.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 5-7 illustrate a schematic block diagram of a welding device, and in particular, an engine driven welding device as discussed in FIGS. 1-4. FIG. 8 illustrates a methodology that can be implemented with one or more welding devices discussed in FIGS. 1-4.

Turning to FIG. 5, a welding device 500 is illustrated. The welding device 500 can include a lock component 502 that is configured to de-activate and/or activate at least one of a controller 508 or a power source 504 based upon receipt of an electronic signal (e.g., also referred to as a link key) from an activation device 506. The lock component 502 employs security techniques and features to the welding device 500 in order to restrict at least an operation or a portion of an operation or functionality of the welding device 500. The activation device 506 can be paired with the welding device, wherein the activation device 506 communicates with the welding device 500 and, in turn, the lock component 502. The communication between the lock component 502 and the activation device 506 can determine whether authorized operation or unauthorized operation is or has occurred. In other words, in an embodiment, the activation device 506 communicates with the welding device 500, and in particular, the lock component 502 in order for the welding device 500 to have complete functionality and/or operation of features.

In an embodiment, the lock component 502 can be configured to receive one or more electronic signals and based on receipt or non-receipt of the one or more electronic signals the welding device 500 can be controlled. In particular, de-activation of the welding device 500 can be based upon whether an electronic signal from the activation device 506 is received. For example, if the electronic signal is received, the lock component 502 can communicate with the welding device 500 to allow activation or continue operation of the welding device 500 if already activated. In another example, the lock component 502 can prevent or terminate operation of the welding device 500 if the electronic signal is not received or detected by the lock component 502.

In such an example of terminating or preventing operation, the lock component 502 can communicate an instruction to at least one of the controller 508, the power source 504, or a component of the welding device 500 to prevent or terminate operation of the welding device 500. By way of example and not limitation, if the electronic signal is not received by the activation device 506 and the power source 504 includes a motor, the lock component 502 can provide termination of a fuel injection to the motor of the welding device, termination of a fuel pump 516 from delivering fuel to the motor, de-activating a starter 518 for the motor, a choke to the engine or motor, a kill switch to the motor or engine, or restriction of an amount of voltage or current output from the motor. By way of example and not limitation, if the electronic signal is not received by the activation device 506 and the power source 504 includes an energy storage device, the lock component 502 can provide termination of delivery of power from the energy storage device, prevention of charging the energy storage device, or restriction of an amount of voltage or current output from the energy storage device.

In still another embodiment, the lock component 502 can be configured to receive a first electronic signal from the controller 508 and a second electronic signal (e.g., also referred to as a link key) from the activation device 506, wherein the lock component 502 can adjust operational functionality and/or features based on receipt of the first electronic signal and/or the second electronic signal. Such adjustment of the functionality of the welding device 500 based on receipt of the first electronic signal and/or the second electronic signal provides enhanced security over conventional security techniques for welding devices. In at least one example, conventional security techniques do not take into account for when a power source is stripped from the welding device. With the subject innovation, without the first electronic signal from the controller 508, the lock component 502 can de-activate and/or prevent use of the power source (e.g., a motor, an engine, etc.) such that separation of the power source 504 from the controller 508 prevents operation of the power source 504.

The lock component 502 can adjust functional features of the welding device 500 based on receipt of at least one electronic signal (e.g., from the activation device 506, from the controller 508, from the activation device and the controller 508, and/or a combination thereof). By way of example and not limitation, the functional features that can be adjusted can be, but are not limited to, termination of a motor or engine, prevention of starting an engine or a motor, termination of a supply of power, prevention of a supply of power, restriction of a power output, restriction of which component to supply or deliver power, performing a welding operation, performing a type of a welding operation, activation or de-activation of a user interface, a user customizable setting of the welding device, powering on or off of the welding device 500, powering on or off of a component of the welding device 500, a welding parameter (as defined above), a data output of the welding device 500, a data output of the user interface, a data input to the welding device 500, a data input to the user interface, among others.

In still another embodiment, the activation device 506 can be paired with the welding device 500 and, in particular, the lock component 502. As mentioned above, a pairing of the activation device 506 with the welding device 500 can include the welding device 500 communicating a discover signal to the activation device 506 and/or other devices in range in which the activation device responds with an identifying signal that provides information of the activation device 506. A selection of the found devices that responded to the discovery signal is made and an authorization code is verified between the welding device 500 and the activation device 506. Upon verification, a link key is created and stored for authenticating that the activation device 506 and the welding device are paired. This link key (e.g., also referred to as an electronic signal and/or a second electronic signal) can be stored on a computer-readable storage medium on at least one of the welding device 500, the activation device 506, or a cloud platform. Moreover, it is to be appreciated that one or more link keys can be generated and stored for one or more activation devices for the welding device or a plurality of welding devices.

The activation device 506 can be a device that can communicate with the lock component 502. In an embodiment, the activation device 506 can be removeably coupled to the lock component 502 and/or a portion of the welding device 500, wherein the activation device 506 presence is detected by the lock component 502. For example, the activation device 506 can complete a circuit by being in a physical location on, within, or in proximity with the welding device 500, wherein the lock component 502 detects completion of the circuit. Such completion of the circuit in the example can indicate an authorized use of the welding device 500. In another example, the activation device 506 can communicate a wireless signal to the welding device 500 such that the electronic signal transmitted from the activation device 506 is detected by the lock component 502. The lock component 502 in this example can detect whether the electronic signal is received from the activation device 506 and, based on the receipt or non-receipt, de-activate, activate, terminate, restrict, and/or prevent operation or a portion of an operation performed by the welding device 500 or a component of the welding device 500.

In an embodiment, the activation device 506 can be a component that can communicate a wireless signal or complete a circuit with the welding device 500 and/or the lock component 502. By way of example and not limitation, the activation device 506 can be, but is not limited to being, a security badge, a fob, a key fob, a smartphone, a cellphone, a tablet, a physical key, a portable gaming device, a wearable device, a Wireless Fidelity (WI-FI) device, a device that can communicate data on or from the Internet, a smart watch, piece of jewelry with electronics, an audio or video playing device, and the like. In another embodiment, the activation device 506 can be included, associated with, integrated with, and/or incorporated into at least one of an article of clothing (e.g., shirt, hat, pants, gloves, among others), a component of the welding device (e.g., torch, cable, user interface, consumable storage, among others), a safety equipment (e.g., helmet, gloves, boots, apron, glasses, among others), a wearable article (e.g., a ring, a watch, glasses, a belt, a shoe, a necklace, a bracelet, and the like), an electronic device, among others.

It is to be appreciated and understood that the communication of the electric signal functionality of the activation device 506 can be imported or included with an additional device that has a primary electronic function. For example, a smartphone can be an additional device that can include the electronic functionality of the activation device 506 to communicate with the lock component 502 (e.g., primary electronic function of the smartphone is for wireless calls). In another example, a key fob for an automobile or a home can be used as the activation device 506 after a pairing with the welding device 500 and/or the lock component 502. In still another example, the activation device 506 can include one or more electronic signals to communicate with one or more respective welding devices and/or lock components. In other words, the activation device 506 can be paired with two or more welding devices, wherein detection of the activation device (or the electronic signal there from) is detected in order to activate the controller 508 or the power source 504.

FIG. 6 illustrates a welding device 600 that includes the lock component 502 for security of operation of the welding device 600. It is to be appreciated that the aspects discussed for welding device 500 can be implemented with welding device 600 and vice versa. The welding device 600 can include the lock component 502 that is configured to adjust functionality of at least one of the controller 508, the power source 504 (e.g., an engine, a motor, etc.), the energy storage device 430, a user interface 512, or an external device 514. The external device 514 can be, but is not limited to being, a generator, a power take-off (PTO), a shaft, an external power source, a tool, an outlet that delivers power, among others. The lock component 502 can prevent or restrict the external device 514 based on receipt of the first electronic signal from the controller 508 and/or the second electronic signal from the activation device.

The user interface 512 can be configured to receive and/or communicate data to and/or from the welding device 600. In a particular example, the user interface 512 can display data to a user and receive a user input from a user. Based on the detection of the first electronic signal or the second electronic signal (e.g., the link key), the lock component 502 can be configured to control at least one of an output of data from the user interface 512, an input received from the user interface 512, data received or communicated from the welding device 600, or a combination thereof.

In an example, the user interface 512 can be restricted in functionality by the lock component 502 based on receipt or non-receipt of a signal (e.g., the first electronic signal, the second electronic signal, the link key, or a combination thereof). For example, data displayed on the user interface 512 can be restricted or prevented by the lock component 502. In another example, the data received or data input from a user can be restricted or prevented by the lock component 502 based on detection of a signal.

For example, a startup of the welding device 600 in which an activation device is not detected can prompt the user interface 512 to a screen asking for a password (e.g., number, letter, symbol, biometric data, combination thereof) in order to install/create/register an activation device 506 or access functionality of the welding device 600. In another embodiment, a payment feature can be provided on the welding device 600 in which a verified monetary payment can allow a registration of the activation device 506 or access to functionality of the welding device 600. The lock component 502 can receive and/or verify a payment and generate access via a link key based on the user interface 512 interactions with a user.

In another example, the lock component 502 can communicate instructions to the user interface 512 to provide a sequence to interact with a user to register, remove, and/or edit activation devices for the welding device 600.

In an example, the lock component 502 can increase a functionality available for the welding device 600 based on a sequence of received electronic signals and/or an amount of received electronic signals. For example, the lock component 502 can be configured to provide at least one of the following: a first set of functionalities for the welding device 500 can be allowed or prevented with receipt of the first electronic signal before the second electronic signal; a second set of functionalities for the welding device 600 can be allowed or prevented with receipt of the second electronic signal before the first electronic signal; a third set of functionalities for the welding device 600 can be allowed or prevented with receipt of both the first electronic signal and the second electronic signal; a fourth set of functionalities for the welding device 600 can be allowed or prevented with receipt of one of the first electronic signal or the second electronic signal; or a combination thereof.

FIG. 7 illustrates a welding device 700 that includes customizable security features for the lock component 502. It is to be appreciated that the features described for welding device 500 and welding device 600 can be utilized with the welding device 700 and vice versa (e.g., features of welding device 700 can be utilized with welding device 600 and/or welding device 500). The lock component 502 can include a settings component 702. The settings component 702 can be configured to receive instructions and/or employ pre-defined configurations for the lock component 502 related to the activating, preventing, and/or de-activating of the welding device 700 (or a component of the welding device 700).

The settings component 702 can implement a duration of time configuration in which a link key or the activation device 506 is registered (e.g., authenticated and/or authorized to access functionality of the welding device 700). By way of example, a link key and/or the activation device 506 can include a duration of time for which the lock component 502 will authorize for activating a portion of an operation or an operation of the welding device 700. The duration of time can be pre-defined, defined based on a user, defined based on a user identification accessing the welding device, among others. In another embodiment, the duration of time can be dependent on a monetary amount as a payment for the use (e.g., rent, lease, rent to own, loan payment, etc.) of the welding device 700.

In another embodiment, the settings component 702 can define a physical distance between the activation device and the welding device in which the welding device can operate if within. For instance, a maximum distance can be defined in which the link key or the second electronic signal can be communicated and/or received between the lock component 502 and the activation device and a defined distance (e.g., less than the maximum distance) can be defined in which the activation of the welding device 700 will be provided via the lock component 502. In another embodiment, the settings component 702 can include a buffer time which affords a duration of time (e.g., referred to as the buffer time) in which the welding device 700 and the activation device 506 can be outside the defined distance but not cause the lock component 502 to de-activate the welding device 700. It is to be appreciated that the distance between the activation device 506 and the welding device 700 can be determined based on a signal strength of the communicated link key and/or the second electronic signal.

For example, a maximum distance can be ten (10) feet, a defined distance can be five (5) feet, and a buffer time can be one (1) minute, wherein a detection of an electronic signal (e.g., a link key) from the activation device 506 affords the lock component 502 to provide access to at least a portion of functionality of the welding device 700. In this example, the lock component 502 can provide the following: activation of the welding device 700 or a functionality of the welding device 700 at a distance less than five (5) feet; de-activation of the welding device 700 or a functionality if the activation device 506 is more than ten (10) feet away from the welding device 700; de-activation of the welding device 700 or a functionality if the activation device 506 is eight (8) feet away from the welding device 700 for more than one (1) minute; and/or activation of the welding device 700 or a functionality if the activation device 506 and the welding device 700 are a distance of eight (8) feet away each other but returned to less than five (feet) distance between each other within one (1) minute.

The settings component 702 can further be configured to receive one or more instructions remotely to control at least one of the controller 508, the lock component 502, the user interface 512, and/or the power source 504. A remote instruction can be received from a source outside the welding device via a wired or wireless communication. For example, the instruction can be related to at least one of the following: activating the welding device or a functionality of the welding device; setting a duration of time for an activation device, generating a link key; generating a password to activate the welding device or a functionality of the welding device; de-activing the welding device via the lock component 502; preventing the welding device to activate; displaying data (e.g., password, duration of time left for an activation device, geographic location of an activation device, etc.) on the user interface 512; activating an audible alarm; resetting or de-activating a link key or an activation device; or a combination thereof.

The lock component 502 can further include a diagnostic component 704 that is configured to communicate a portion of diagnostic data to the user interface 512 and/or a diagnostic device in communication with the welding device 700. In particular, the lock component 502 can be configured to activate a diagnostic functionality of the welding device 700 to generate a diagnostic evaluation which can result in diagnostic data used in troubleshooting an error or fault with the welding device 700. For instance, the lock component 502 can be configured to activate the diagnostic functionality based on either receipt of one or more electronic signals from the activation device 506 and/or the controller 508. The welding device 700 can include one or more diagnostic functionalities, wherein receipt or non-receipt of the link key or electronic signals can determine whether the diagnostic component 704 can be configured to run a diagnostic procedure and/or to deliver diagnostic data. In another embodiment, the order of receiving electronic signals (e.g., first electronic signal, second electronic signal, link key, etc.) and/or the number of received electronic signals can be evaluated by the lock component 502 or the diagnostic component 704 to activate or de-activate particular diagnostic functionalities for the welding device 700. For example, a diagnostic functionality can be related to troubleshooting at least one of the user interface 512, the controller 508, the power source 504, a functionality of the welding device 700, a power output, a voltage output, a waveform, a memory test, among others.

In an embodiment, the welding device can include a user interface that is configured to communicate data via a display related to the welding device and the lock component is further configured to activate the user interface based on receipt of the link key from the activation device.

In an embodiment, the welding device can include the lock component that receives a request for a diagnostic access of the welding device to transmit a portion of diagnostic data and the lock component is configured to transmit the portion of diagnostic data in response to the request while preventing the motor or the equipment from activating due to an absence of receipt of the link key from the activation device.

In an embodiment, the welding device can include one of the following: an energy storage device that is an additional power source for the welding device or the equipment electrically coupled to the welding device; a switch component that selects between the energy storage device and the motor based on a welding parameter; and the lock component is configured to prevent the energy storage device from supplying power to perform the welding operation unless the link key is received from the activation device.

In an embodiment, the welding device can include a controller that is configured to adjust a welding parameter used to perform a welding operation with the motor as a power source and the lock component is further configured to prevent an activation of the controller so as to prevent the welding operation to be performed.

In an embodiment, the welding device can include an additional activation device that is electronically paired to the welding device, that includes: a second discovery signal transmitted from the welding device to the additional activation device and the activation device transmitting a second identifying signal that identifies the additional activation device in response to the second discovery signal, wherein a second authorization code is verified between the additional activation device and the welding device; and an additional link key that is generated by the welding device and stored in response to the second authorization code verification. In the embodiment, the lock component is further configured to prevent the motor or the equipment from activating unless the link key or the additional link key are received from the activation device and the additional activation device respectively and the lock component is further configured to de-activate the motor or the equipment upon interruption of one of a) the receipt of the link key from the activation device; or b) the receipt of the additional link key from the additional activation device.

In an embodiment, the lock component is further configured to terminate the link key after a pre-defined duration of time. In an embodiment, the welding device can include a database that stores an identification with a user and a welding device setting for the identification and the pre-defined duration of time is based upon the identification of a user. In an embodiment, the lock component is further configured to transmit a wireless signal to detect, via a signal in response to the wireless signal, one or more activation devices that can utilize one or more link keys.

In an embodiment, the lock component is further configured to receive a remote signal that is an instruction to perform at least one of the following: delete one or more link keys generated by the link key generator; bypass the lock component and activate the motor or the equipment without the activation key; generate one or more link keys; or bypass the lock component and de-activate the motor or the equipment.

In an embodiment, the lock component is further configured to define one or more geographic areas that allow receipt of the link key from the activation device; the activation device and the welding device are physically located within the one or more geographic area to enable activation of the motor; and the motor is de-activated or prevented from starting based on the activation device or the welding device being outside the one or more geographic areas.

In an embodiment, the power supply is at least one of an energy storage device or a motor. In an embodiment, the lock component is configured to communicate with the controller to perform at least one of the following if the first electronic signal or the second electronic signal are not detected: terminate a fuel injection to the motor; terminate a fuel pump 516 from delivering fuel to the motor; or de-activate a starter 518 for the motor.

In an embodiment, the controller is further configured to terminate a delivery of power from the energy storage device to perform the welding operation based on an instruction from the lock component in response to not detecting the first electronic signal or the second electronic signal.

In an embodiment, the welding device can include a settings component that is configured to de-activate the power supply based on a pre-defined duration of time for the activation device. In the embodiment, the settings component that is further configured to re-activate the power supply if the first electronic signal or the second electronic signal is not detected and a pre-defined user entry is received from the user interface. In the embodiment, the settings component that is configured to de-activate the power source or the additional power source based on a pre-defined duration of time for the activation device; and the settings component is further configured to re-activate the power source or the additional power source if the first electronic signal or the second electronic signal is not detected and a pre-defined user entry is received.

In an embodiment, the welding device can include a diagnostic component that is configured to communicate diagnostic data to an external device based upon connectivity of the external device to the welding device or receipt of a diagnostic entry input from the user interface.

In view of the exemplary devices and elements described supra, methodologies that may be implemented in accordance with the disclosed subject matter will be better appreciated with reference to the flow charts and/or methodologies of FIG. 8. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 800 of FIG. 8 which is flow diagram 800 that controls a welding device based on receipt of an electronic signal or a connection with an activation device. An activation device can be paired with a welding device (reference block 810). A connection between the activation device and the welding device can be detected (reference block 820). The welding device can be de-activated based on a termination of the connection (reference block 830).

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding system for performing a welding operation, comprising:
   a welding device; and
   an activation device configured to transmit an activation signal to the welding system;
   wherein the welding device including:
      a welding power source;
      a power supply configured to a provide electrical power to the welding power source, wherein the welding power source is configured to generate a welding output for the welding operation;
      a controller configured to control at least one of the power supply or the welding power source to execute the welding operation;
      a user interface configured to enable a user to set parameters for the welding operation; and
      a lock component configured to disable the power supply in response to failing to receive respective electronic signals indicating a presence of the controller in operational connection with the power supply and the activation signal from the activation device.

2. The welding system of claim 1, wherein the activation device, upon receiving a user input entered via the user interface, is configured to communicate a first electronic signal to the lock component, wherein the lock component is configured to enable the power supply in response to, at least in part, the first electronic signal.

3. The welding system of claim 1, wherein the lock component, upon receiving a user input entered via the user interface, is configured to register the activation device.

4. The welding system of claim 3, wherein the lock component, after registration of the activation device, is configured to accept a first electronic signal communicated by the activation device and enable operation of the activation device.

5. The welding system of claim 1, wherein the power supply is at least one of an engine-driven generator or a battery system.

6. The welding system of claim 1, wherein the activation device is a portable device configured to communicate a first electronic signal to the lock component upon attachment to the welding device via a physical connection.

7. The welding system of claim 1, wherein the controller is configured to communicate a second electronic signal indicating when the controller is in operational connection with the power supply, and
   wherein the lock component is configured to disable the power supply when the power supply is removed from the welding system and not in operational connection with the controller.

8. The welding system of claim 1, wherein the activation device includes at least one of a security badge, a fob, a key fob, a smartphone, a cellphone, a tablet computer, a physical key, a portable gaming device, a wearable device, a wireless device, a device configured to communicate data on or from the internet, a smart watch, a piece of jewelry having electronics, or an audio or video playing device.

9. The welding system of claim 1, wherein the activation device is configured to be incorporated into at least one of a wearable article, a welding torch, or a welding helmet.

10. The welding system of claim 1, wherein the power supply includes a fuel-injected motor, and the lock component is configured to communicate with the controller to provide termination of fuel injection to the fuel-injected motor to disable the power supply.

11. The welding system of claim 1, wherein the power supply includes a motor and a fuel pump, and the lock component is configured to communicate with the controller to provide termination of the fuel pump from delivering fuel to the motor to disable the power supply.

12. The welding system of claim 1, wherein the power supply includes a motor and a starter, and the lock component is configured to de-activate the starter to disable the power supply.

13. The welding system of claim 1, wherein the power supply includes a motor and a choke, and the lock component is configured to adjust the choke to disable the power supply.

14. The welding system of claim 1, wherein the power supply includes a motor and a kill switch, and the lock component is configured to activate the kill switch to disable the power supply.

15. The welding system of claim 1, wherein the power supply includes a motor, and the lock component is configured to restrict an amount of a voltage or a current output from the motor to disable the power supply.

16. The welding system of claim 1, wherein the power supply includes an energy storage device, and the lock component is configured to communicate with the controller to terminate delivery of power from the energy storage device to disable the power supply.

17. The welding system of claim 1, wherein the power supply includes an energy storage device, and the lock component is configured to communicate with the controller to prevent charging of the energy storage device to disable the power supply.

18. The welding system of claim 1, wherein the power supply includes an energy storage device, and the lock component is configured to communicate with the controller to restrict an amount of a voltage or a current output from the energy storage device to disable the power supply.

* * * * *